US 009643609B2

(12) United States Patent
Bureau et al.

(10) Patent No.: US 9,643,609 B2
(45) Date of Patent: May 9, 2017

(54) MOTOR VEHICLE AND METHOD OF CONTROL THEREOF

(75) Inventors: Baptiste Bureau, Coventry (GB); Ajay-Neil Kemwal, Coventry (GB); Adam Keith Leatherland, Coventry (GB); Rob Palin, Coventry (GB)

(73) Assignee: JAGUAR LAND ROVER LIMITED, Whitley, Coventry (GB)

( * ) Notice: Subject to any disclaimer, the term of this patent is extended or adjusted under 35 U.S.C. 154(b) by 112 days.

(21) Appl. No.: 14/004,919

(22) PCT Filed: Mar. 14, 2012

(86) PCT No.: PCT/EP2012/054440
§ 371 (c)(1),
(2), (4) Date: Oct. 16, 2013

(87) PCT Pub. No.: WO2012/123483
PCT Pub. Date: Sep. 20, 2012

(65) Prior Publication Data
US 2014/0039773 A1 Feb. 6, 2014

(30) Foreign Application Priority Data
Mar. 15, 2011 (GB) .................................. 1104334.6

(51) Int. Cl.
*G06F 7/70* (2006.01)
*G06F 19/00* (2011.01)
(Continued)

(52) U.S. Cl.
CPC ....... *B60W 30/18054* (2013.01); *B60T 7/122* (2013.01); *B60W 10/06* (2013.01);
(Continued)

(58) Field of Classification Search
CPC . B60W 30/18054; B60W 10/06; B60K 41/20; G06G 7/70; F02N 11/08
(Continued)

(56) References Cited

U.S. PATENT DOCUMENTS 6,135,920 A * 10/2000 Kamiya et al. ............... 477/185
6,532,926 B1 * 3/2003 Kuroda et al. ............. 123/179.4
(Continued)

FOREIGN PATENT DOCUMENTS

DE 10009504 A1 8/2001
EP 2090487 A1 8/2009
(Continued)

OTHER PUBLICATIONS

English Translation of JP2007331514A.*
International Search Report for International application No. PCT/EP2012/054440 dated Jun. 8, 2012.

*Primary Examiner* — Jelani Smith
*Assistant Examiner* — Mahmoud Ismail
(74) *Attorney, Agent, or Firm* — Carlson, Gaskey & Olds

(57) ABSTRACT

Embodiments of the invention provide a vehicle comprising actuator operable to provide motive power to the vehicle, the vehicle being operable automatically to switch off and subsequently to restart the actuator thereby to reduce an amount of time the actuator is on, wherein the vehicle may be placed in an eco-stop condition by a driver-operated brake in which the vehicle is held stationary and the actuator is off, the vehicle being operable automatically to perform an eco-start operation in which the actuator is restarted when the driver releases the brake, wherein when an eco-start is performed the vehicle is arranged automatically to be held stationary by the brake whilst the actuator is restarted, if the actuator fails to restart the vehicle being further arranged (Continued)

automatically to assume a failed start condition in which the vehicle continues to be held stationary.

18 Claims, 2 Drawing Sheets

(51) Int. Cl.

| | | |
|---|---|---|
| G06G 7/00 | (2006.01) | |
| G06G 7/76 | (2006.01) | |
| B60W 10/18 | (2012.01) | |
| B60W 30/18 | (2012.01) | |
| B60T 7/12 | (2006.01) | |
| B60W 50/029 | (2012.01) | |
| B60W 10/06 | (2006.01) | |
| B60W 10/184 | (2012.01) | |
| G06G 7/70 | (2006.01) | |
| B60W 10/04 | (2006.01) | |
| F02N 11/08 | (2006.01) | |

(52) U.S. Cl.
CPC ........ B60W 10/182 (2013.01); B60W 10/184 (2013.01); B60W 30/18118 (2013.01); B60W 50/029 (2013.01); B60T 2201/06 (2013.01); B60W 2050/0297 (2013.01)

(58) Field of Classification Search
USPC ............... 701/70, 112; 477/185; 123/179.4
See application file for complete search history.

(56) References Cited

U.S. PATENT DOCUMENTS

| | | |
|---|---|---|
| 2002/0086772 A1 | 7/2002 | Abe et al. |
| 2003/0004635 A1* | 1/2003 | Kamiya et al. ............... 701/112 |
| 2010/0279818 A1 | 11/2010 | Soliman et al. |

FOREIGN PATENT DOCUMENTS

| | | | |
|---|---|---|---|
| FR | 2849811 A1 | | 7/2004 |
| JP | H11321629 A | | 11/1999 |
| JP | 2001164957 A | | 6/2001 |
| JP | 2007331514 A | * | 12/2007 |
| JP | 2008500217 A | | 1/2008 |
| JP | 2008116002 A | | 5/2008 |
| JP | 2011143875 A | | 7/2011 |
| WO | 2006046273 A1 | | 5/2006 |

* cited by examiner

MOTOR VEHICLE AND METHOD OF CONTROL THEREOF

FIELD OF THE INVENTION

The present invention relates to a motor vehicle and to a method of controlling a motor vehicle. In particular but not exclusively the invention relates to a stop/start vehicle and a method of control thereof in the event of a failed engine start.

BACKGROUND

It is known to provide a motor vehicle having stop/start functionality in which an engine of the vehicle is switched off to save fuel when conditions permit such as when the vehicle is held stationary with a driver-operated brake pedal depressed. When the driver releases the brake pedal the engine is restarted and a driveline of the vehicle is driven by the engine via a transmission.

The problem exists that if the vehicle is held stationary whilst facing uphill on a slope and the engine fails to restart when the brake pedal is released, the vehicle may roll backwards down the slope. It is an aim of embodiments of the invention to at least partly mitigate this disadvantage of known stop/start vehicles.

SUMMARY

In a first aspect of the invention there is provided a motor vehicle comprising actuator means operable to provide motive power to the vehicle, the vehicle being operable automatically to switch off and subsequently to restart the actuator means during a drivecycle thereby to reduce an amount of time for which the actuator means is on during a given drivecycle, wherein the vehicle may be placed in an eco-stop condition by driver-operated brake means in which the vehicle is held stationary and the actuator means is off, the vehicle being operable automatically to perform an eco-start operation in which the actuator means is restarted when the driver signals release of the brake means, wherein when an eco-start is performed the vehicle is arranged automatically to continue to be held stationary by means of the brake means whilst the actuator means is restarted, if the actuator means fails to restart the vehicle being further arranged automatically to assume a failed start condition in which the vehicle continues to be held stationary substantially indefinitely.

By "actuator means" is meant, without limitation, an apparatus or device for providing motive power to the vehicle, such as a prime mover, combustion engine, electric machine or the like. Embodiments of the invention have the advantage that if the actuator means fails to restart when the vehicle is in the eco-stop condition the vehicle will not roll backwards.

It is to be understood that by the term substantially indefinitely is meant that in the failed start condition the fact that the actuator means has failed to start does not affect continued holding of the vehicle in the stationary condition. Thus, holding of the vehicle stationary is not dependent on restarting of the actuator means.

For example, if the actuator means comprises an engine and the vehicle were held stationary in the failed start condition by means of brake means that was reliant on the engine for continued brake efficacy, the brakes will lose their efficacy after a certain period of time. For example if driver-operated brakes are dependent on maintenance of a brake vacuum level that deteriorates with time, the brake efficacy will deteriorate if the brake vacuum level is dependent on the operation of an engine-driven vacuum pump, Embodiments of the invention have the advantage that because the vehicle is arranged to be held stationary substantially indefinitely a risk that the vehicle suffers rollaway due to failure of engine-maintained brake means is reduced.

It is to be understood that in some embodiments the actuator means is switched off in the eco-stop condition in order to reduce at least one selected from amongst fuel consumption, an amount of one or more gases emitted by the engine, and an amount of current consumed by an electric machine/electric motor.

Embodiments of the invention have the advantage that if the engine fails to restart when the engine is in the eco-stop condition the vehicle will not roll backwards or forwards when standing on a slope.

In an embodiment, in the failed start condition the vehicle is held stationary automatically by means of the brake means.

The brake means may comprise a primary brake and a secondary brake, the primary brake being operable by a driver to decelerate the vehicle, the secondary brake comprising a parking brake operable by the driver to hold the vehicle stationary when the vehicle is unattended.

Optionally in the eco-stop condition the vehicle is automatically held stationary by means of the primary brake.

Further optionally, in the failed start condition the vehicle is configured automatically to hold the vehicle stationary by means of the secondary brake.

This feature has the advantage that the vehicle is placed automatically in a condition in which it may be left unattended by a driver in the event of a failed start without rolling downhill.

In an embodiment, the vehicle has a transmission having a park mode in which park mode brake means is applied to prevent movement of the vehicle, wherein when in the failed start condition the vehicle continues to hold the vehicle stationary by controlling the transmission automatically to assume the park mode.

The park mode brake means may comprise at least one pin element operable to lock the transmission thereby to prevent rotation of at least one wheel of the vehicle Optionally the failed start condition is assumed if the actuator means fails to start within a prescribed time period.

The prescribed time period may be less than a maximum permitted holding time of the primary brake.

This feature has the advantage that if the vehicle is held stationary in the eco-stop condition by means of the primary brake and the vehicle is held stationary in the failed start condition by means other than the primary brake such as the secondary brake or park mode brake means, a risk that the vehicle rolls backwards when in the eco-stop mode is reduced.

The risk that the vehicle rolls backwards may exist for example if the primary brake is reliant on an engine-driven pump or the like and the effectiveness of the primary brake decreases with time when the engine is off.

The period may be responsive to the amount of pressure being developed by the primary brake to hold the vehicle stationary.

Optionally the vehicle is configured to assume the failed start condition only if the vehicle is facing uphill on a slope.

Alternatively the vehicle may be configured to assume the failed start condition only if the vehicle is facing downhill on a slope.

The vehicle may be operable to override the failed start condition thereby to allow the vehicle to be moved.

This feature has the advantage that following a failed engine start the vehicle may be moved to a safe location, for example by towing.

In an embodiment the actuator means comprises an engine, the vehicle being arranged to be held in the eco-stop condition by the driver-operated brake means in which the vehicle is stationary and the engine is off, the vehicle being operable automatically to restart the engine when the driver signals release of the brake means.

The vehicle may be operable automatically to switch off and subsequently to restart the actuator means during a drivecycle in order to reduce a value of one or more operating parameters of the vehicle.

Optionally the one or more operating parameters of the vehicle are selected from amongst a rate of consumption of a fuel by the engine and an amount of one or more gases emitted by the engine.

Further optionally the one or more operating parameters include the amount of one or more gases emitted by the engine, the one or more gases including at least one selected from amongst carbon dioxide, nitrous oxide and sulphur dioxide.

Optionally the vehicle is a hybrid electric vehicle (HEV) wherein the actuator means comprises an engine and an electric machine.

The vehicle may be operable in a parallel HEV mode in which the engine and the electric machine provide motive torque to drive the vehicle in parallel.

Alternatively or in addition the vehicle may be operable in a series HEV mode in which the engine generates electric power to drive the electric machine thereby to provide motive torque to the vehicle.

In a second aspect of the invention there is provided a method of controlling a motor vehicle having actuator means operable to provide motive power to the vehicle, the method comprising controlling the vehicle automatically to assume an eco-stop condition in which the actuator means is switched off in order to reduce fuel consumption, the method further comprising holding the vehicle stationary in the eco-stop condition by means of driver operated brake means and controlling the vehicle to perform an eco-start wherein the actuator means is restarted when the driver signals release of the driver operated brake means, in the event the actuator means fails to restart the method comprising controlling the vehicle automatically to continue to hold the vehicle stationary substantially indefinitely.

In one aspect of the invention there is provided a motor vehicle comprising an engine and a transmission, the vehicle being operable in a stop/start mode in which the vehicle is controlled automatically to assume an eco-stop condition in which the engine is switched off in order to reduce fuel consumption, when the vehicle is held stationary in the eco-stop condition by driver-operated brake means the vehicle being operable to perform an eco-start wherein the engine is restarted when the driver signals release of the brake means, wherein when an eco-start is performed the vehicle is arranged automatically to continue to be held stationary by means of the brake means, if the engine fails to restart the vehicle being further arranged automatically to assume a failed start condition in which the vehicle continues to be held stationary.

Within the scope of this application it is envisaged that the various aspects, embodiments, examples and alternatives, and in particular the individual features thereof, set out in the preceding paragraphs, in the claims and/or in the following description and drawings, may be taken independently or in any combination. For example features described in connection with one embodiment are applicable to all embodiments, unless such features are incompatible.

BRIEF DESCRIPTION OF THE DRAWINGS

Embodiments of the invention will now be described, by way of example only, with reference to the accompanying figures in which.

DETAILED DESCRIPTION

Figure 1:
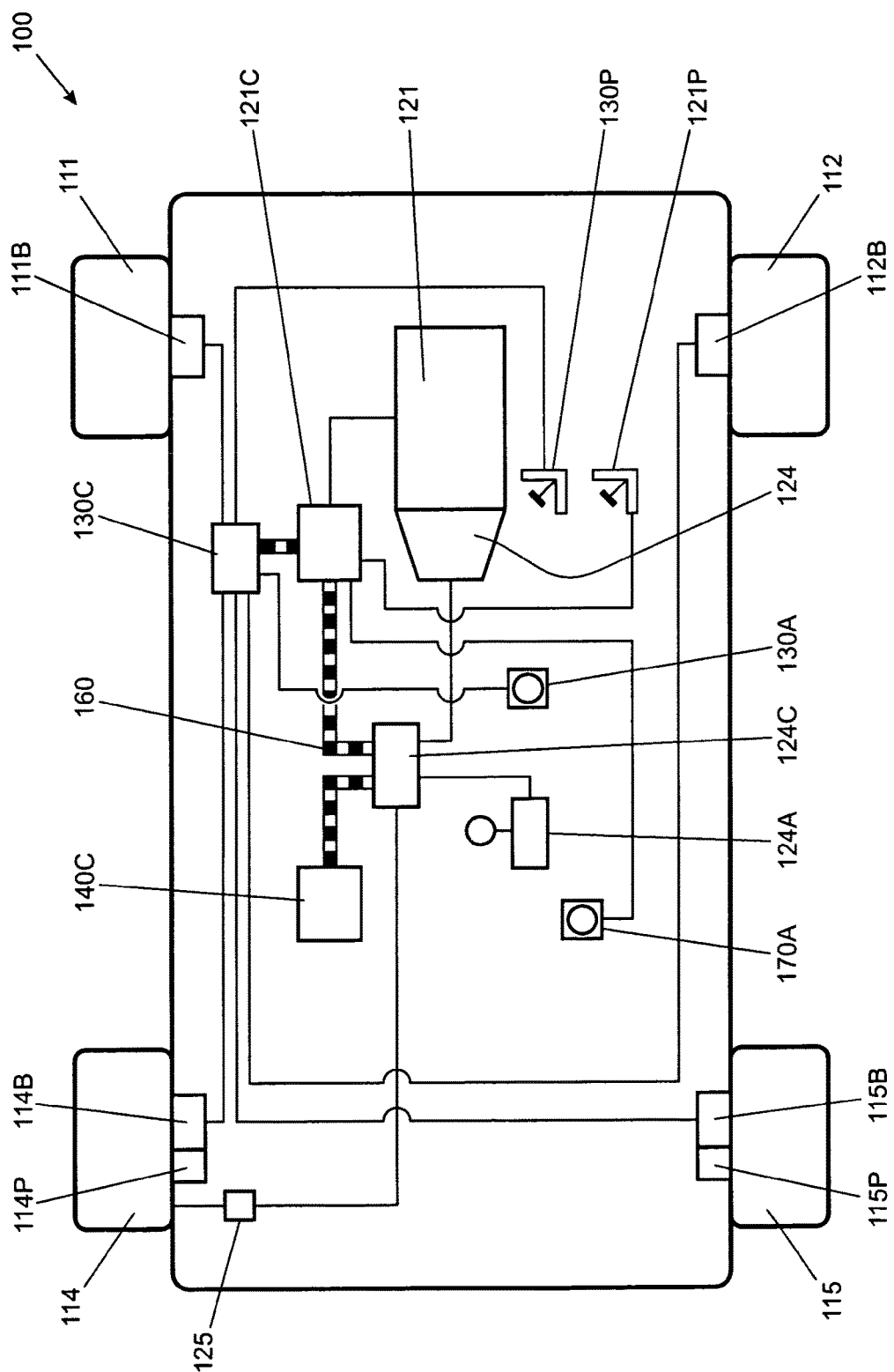
FIG. 1 is a schematic illustration of a stop/start motor vehicle according to an embodiment of the present invention.

FIG. 1 shows a stop/start vehicle 100 according to an embodiment of the invention having an internal combustion engine 121, an automatic transmission 124 and a set of four wheels 111, 112, 114, 115. Each of the wheels has a respective disc brake 111 B, 112B, 114B, 115B operable by means of a driver operated brake pedal 130P to decelerate the vehicle when the vehicle is moving. Rear wheels 114, 115 of the vehicle are also provided with a respective driver operated parking brake 114P, 115P each in the form of a drum brake. The parking brakes 114P, 115P are operable to be applied and released by means of a driver-operated parking brake actuator 130A in the form of a push-button actuator.

Figure 2:
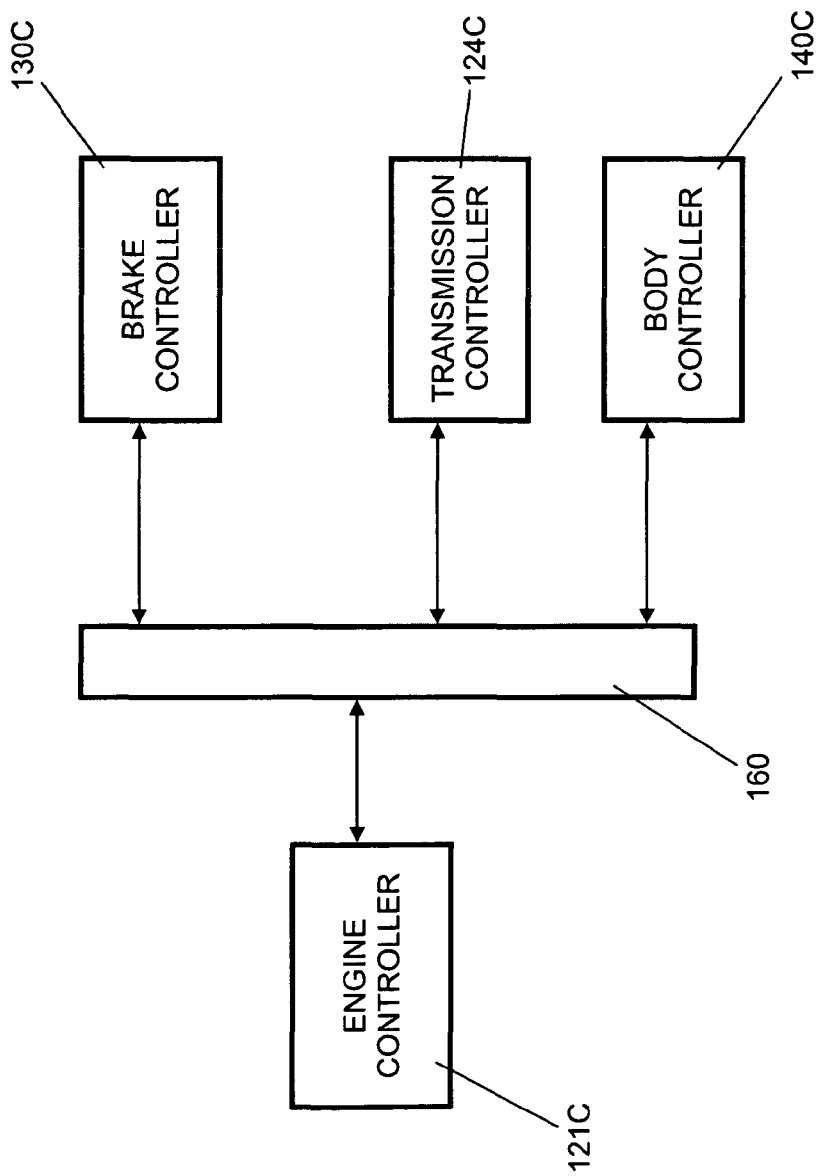
FIG. 2 is a schematic illustration of a control architecture of the vehicle of FIG. 1.

The vehicle 100 has an engine controller 121C, a brake controller 130C, a transmission controller 124C and a body controller 140C. The controllers 121C, 130C, 124C, 140C are arranged to communicate with one another by means of a controller area network (CAN) bus 160 as illustrated in FIG. 2.

The engine 121 is operable to be started and stopped by means of the engine controller 121C. The engine controller 121 is arranged to implement a stop/start scheduler that determines when the engine 121 should be stopped according to a stop/start control methodology. When it is determined that the engine should be stopped the stop/start scheduler commands the engine controller 121C to stop the engine 121. When it is determined that the engine 121 should be restarted, the stop/start scheduler commands the engine controller 121C to restart the engine 121. Stopping and starting of the engine may occur whilst the vehicle is moving, or whilst stationary as described in more detail below.

The brake controller 130C is operable to apply the parking brakes or disc brakes according to signals received from the brake pedal 130P and parking brake actuator 130A, respectively.

The transmission controller 124C is operable to control the transmission 124 to connect and disconnect the transmission 124 from the engine 121. The controller 124C is also operable to control the transmission 124 to operate according to one of a plurality of modes of operation. A driver operable actuator 124A is coupled to the transmission controller 124C by means of which the driver may select the required mode.

In the embodiment of FIG. 1 the modes are: (1) a park mode in which the transmission 124 is disconnected from the engine 121 and a park mode pin element (not shown) is controlled to lock the transmission 124 thereby to immobilise the vehicle; (2) a reverse mode in which the transmission 124 is arranged to drive the vehicle in a reverse direction; (3) a neutral mode in which the transmission 124 is disengaged from the engine but the park mode pin element is not engaged; a drive mode in which the transmission 124 is engaged with the engine 121 and is operable automatically to select a required one of eight forward gears of the transmission 124; and a low gear mode in which the transmission 124 is operable automatically to select a first or second gear only.

It is to be understood that other numbers of gears are also useful such as five, six, nine or any other suitable number of gears.

It is to be understood that the vehicle 100 may control the transmission 124 by means of the transmission controller 124C to assume the park mode when required.

It is to be understood that in some embodiments, when the transmission controller 124C controls the transmission 124 to assume the park mode the vehicle 100 is controlled such that a driver-operable transmission mode selector assumes the park mode in addition to the transmission 124 itself assuming the park mode.

In some embodiments the transmission mode selector is required to be physically moved in order to assume the park mode. In some alternative embodiments the transmission mode selector is not required to physically move. Rather, since the physical position of the selector is not indicative of the selected mode, an electronically-controlled indication of the selected mode is provided whereby the selected mode may be determined by the driver.

The vehicle 100 is operable to commence or terminate operation according to the stop/start control methodology according to the state of a driver-operated actuator 160A. In the 'stop/start mode', the vehicle 100 is arranged to control the engine 121 to stop under selected conditions in which a fuel saving may be made as noted above. When not in the stop/start mode the engine 121 is not stopped unless the driver shuts down the engine 122, for example after parking.

For example, if the driver holds the vehicle 100 in a stationary condition by means of the brake pedal 130P (which applies the disc brakes 111B-115B as described above), in the stop/start mode the vehicle 100 is arranged to switch off the engine 121 thereby to save fuel. This state will be referred to as an 'eco-stop condition'. That is, the vehicle 100 is stationary with the engine 121 stopped automatically according to the stop/start control methodology of the vehicle 100.

When the driver releases the brake pedal 130P the disc brakes 111B-115B continue to be applied automatically by the vehicle 100 and the engine 121 is restarted. (It is to be understood that the engine controller 121C is arranged to receive an input from the brake controller 130C. When the engine has been stopped according to a command by the stop/start scheduler, the brake controller 130C is arranged to trigger the stop/start scheduler to restart the engine 121 when the brake pedal 130P is released).

Once the engine 121 has restarted, the transmission is re-engaged to the engine 121 and the disc brakes 111B-115B are released.

It is to be understood that the disc brakes continue to be held automatically by the brake controller 140C whilst the engine 121 is restarted in order to prevent rollaway. This phenomenon may be referred to as 'rollaway' and includes both forward and backward rolling of the vehicle on a slope.

If the engine 121 fails to restart within a prescribed period of time of the brake pedal 130P being released, the vehicle is controlled automatically to place the transmission 124 in the park mode. The vehicle is therefore placed in a condition in which the driver may exit the vehicle directly without risk of vehicle rollaway.

In some embodiments the vehicle 100 is arranged to apply the parking brakes 114P, 115P in addition to or instead of placing the transmission 124 in the park mode if the engine 121 fails to start.

Embodiments of the present invention have the advantage that if the engine 121 fails to restart when the vehicle 100 is on a slope, the vehicle 100 is prevented from rolling down the slope. For example, in vehicles having engine driven brake fluid compressors (or alternatively vacuum pumps) to maintain disc brake pressure, if the engine fails to restart and the driver or vehicle 100 continues to hold the vehicle stationary using the disc brakes 111B-115B the brakes may suffer decreased performance due to a deterioration in disc brake pressure.

By controlling the vehicle 100 automatically to place the transmission 124 in the park mode (and/or apply the parking brakes 114P, 115P) following a failed engine restart a risk of the vehicle 100 suffering rollaway may be reduced.

It is to be understood that some embodiments of the invention are in the form of a hybrid electric vehicle (HEV) having an engine and at least one electric machine. The HEV may be operated in a parallel mode in which the engine drives the vehicle and optionally the at least one electric machine or an EV mode in which only the electric machine drives the vehicle. Some embodiments of the invention include series-type HEVs in which the engine generates electric power to power the electric machine.

Throughout the description and claims of this specification, the words "comprise" and "contain" and variations of the words, for example "comprising" and "comprises", means "including but not limited to", and is not intended to (and does not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

The invention claimed is:

1. A vehicle comprising actuator means operable to provide motive power to the vehicle, the vehicle being operable automatically to switch off and subsequently to restart the actuator means during a drivecycle thereby to reduce an amount of time the actuator means is on during a given drivecycle,
   wherein the vehicle is configured to be placed in a stop condition by a driver operation of brake means, in the stop condition the vehicle is held stationary and the actuator means is off, the vehicle being operable automatically to perform a start operation in which the actuator means is restarted when the driver signals release of the brake means,
   wherein when the start operation is performed the vehicle is arranged automatically to continue to be held stationary by the brake means while the actuator means is restarted and if the actuator means fails to restart the vehicle is arranged automatically to assume a failed start condition in which the vehicle continues to be held stationary;

wherein the brake means comprises a primary brake being operable by the driver to decelerate the vehicle, and the vehicle includes a secondary brake comprising a parking brake operable by the driver to hold the vehicle stationary when the vehicle is unattended, wherein in the stop condition the vehicle is automatically held stationary by means of the primary brake and in the failed start condition the vehicle is configured automatically to hold the vehicle stationary by automatically placing a transmission of the vehicle in a park mode.

2. A vehicle as claimed in claim 1, wherein in the failed start condition the vehicle is configured automatically to hold the vehicle stationary by means of the secondary brake.

3. A vehicle as claimed in claim 1, wherein when in the failed start condition the vehicle continues to hold the vehicle stationary by controlling the transmission automatically to assume the park mode.

4. A vehicle as claimed in claim 3, wherein controlling the transmission automatically to assume the park mode comprises controlling at least one pin element operable to lock the transmission thereby to prevent rotation of at least one wheel of the vehicle.

5. A vehicle as claimed in claim 1, wherein the failed start condition is assumed if the actuator means fails to start within a prescribed time period.

6. A vehicle as claimed in claim 5, wherein the prescribed time period is less than a maximum permitted holding time of a primary brake.

7. A vehicle as claimed in claim 1, wherein the vehicle is configured to assume the failed start condition only if the vehicle is facing uphill on a slope.

8. A vehicle as claimed in claim 1, wherein the vehicle is configured to assume the failed start condition only if the vehicle is facing downhill on a slope.

9. A vehicle as claimed in claim 1, wherein the vehicle is operable to override the failed start condition thereby to allow the vehicle to be moved.

10. A vehicle as claimed in claim 1, wherein the actuator means comprises an engine, the vehicle being arranged to be held in the stop condition by the brake means in which the vehicle is stationary and the engine is off, the vehicle being operable automatically to restart the engine when the driver signals release of the brake means.

11. A vehicle as claimed in claim 1, wherein the vehicle is operable automatically to switch off and subsequently to restart the actuator means during a drivecycle in order to reduce a value of one or more operating parameters of the vehicle.

12. A vehicle as claimed in claim 11, wherein the one or more operating parameters of the vehicle are selected from a rate of consumption of a fuel and an amount of one or more emitted gases.

13. A vehicle as claimed in claim 11, wherein the one or more operating parameters include an emitted amount of one or more gases including at least one selected from carbon dioxide, nitrous oxide and sulphur dioxide.

14. A vehicle as claimed in claim 1, wherein the vehicle is a hybrid electric vehicle (HEV) wherein the actuator means comprises an engine and an electric machine.

15. A vehicle as claimed in claim 14, wherein the vehicle is operable in a parallel HEV mode in which the engine and the electric machine provide motive torque to drive the vehicle in parallel.

16. A vehicle as claimed in claim 14, wherein the vehicle is operable in a series HEV mode in which the engine generates electric power to drive the electric machine thereby to provide motive torque to the vehicle.

17. A method of controlling a vehicle having actuator means operable to provide motive power to the vehicle, the method comprising:

controlling the vehicle automatically to assume a stop condition in which the actuator means is switched off in order to reduce fuel consumption;

holding the vehicle stationary in the stop condition by using a primary brake that is operable by a driver to decelerate the vehicle;

controlling the vehicle to perform a start operation wherein the actuator means is restarted when the driver signals release of brake means; and controlling the vehicle automatically to continue to hold the vehicle stationary by automatically placing a transmission of the vehicle in a park mode in a failed start condition in which the actuator means fails to restart.

18. A vehicle, comprising:

a motor configured to provide motive power to the vehicle;

a controller that is configured to automatically switch off and subsequently to restart the motor during a drive cycle thereby to reduce an amount of time the motor is on during the drive cycle;

a primary brake that is operable by a driver to decelerate the vehicle;

a secondary brake that is operable as a parking brake to hold the vehicle stationary when the vehicle is unattended;

the controller being configured to place the vehicle in a stop condition in which the vehicle is held stationary by the primary brake and the motor is turned off;

the controller being configured to automatically perform a start operation in which the motor is restarted when the driver signals release of the primary brake;

wherein during the start operation, the vehicle is automatically held stationary by the primary brake while the motor is restarted;

wherein the controller automatically assumes a failed start condition if the motor fails to restart during the start operation and the vehicle is held stationary during the failed start condition by a transmission of the vehicle automatically being placed in a park mode.

* * * * *